W. E. PRALL.
Improvement in Steam Water-Elevators
No. 5,138. Reissued Nov. 5, 1872.
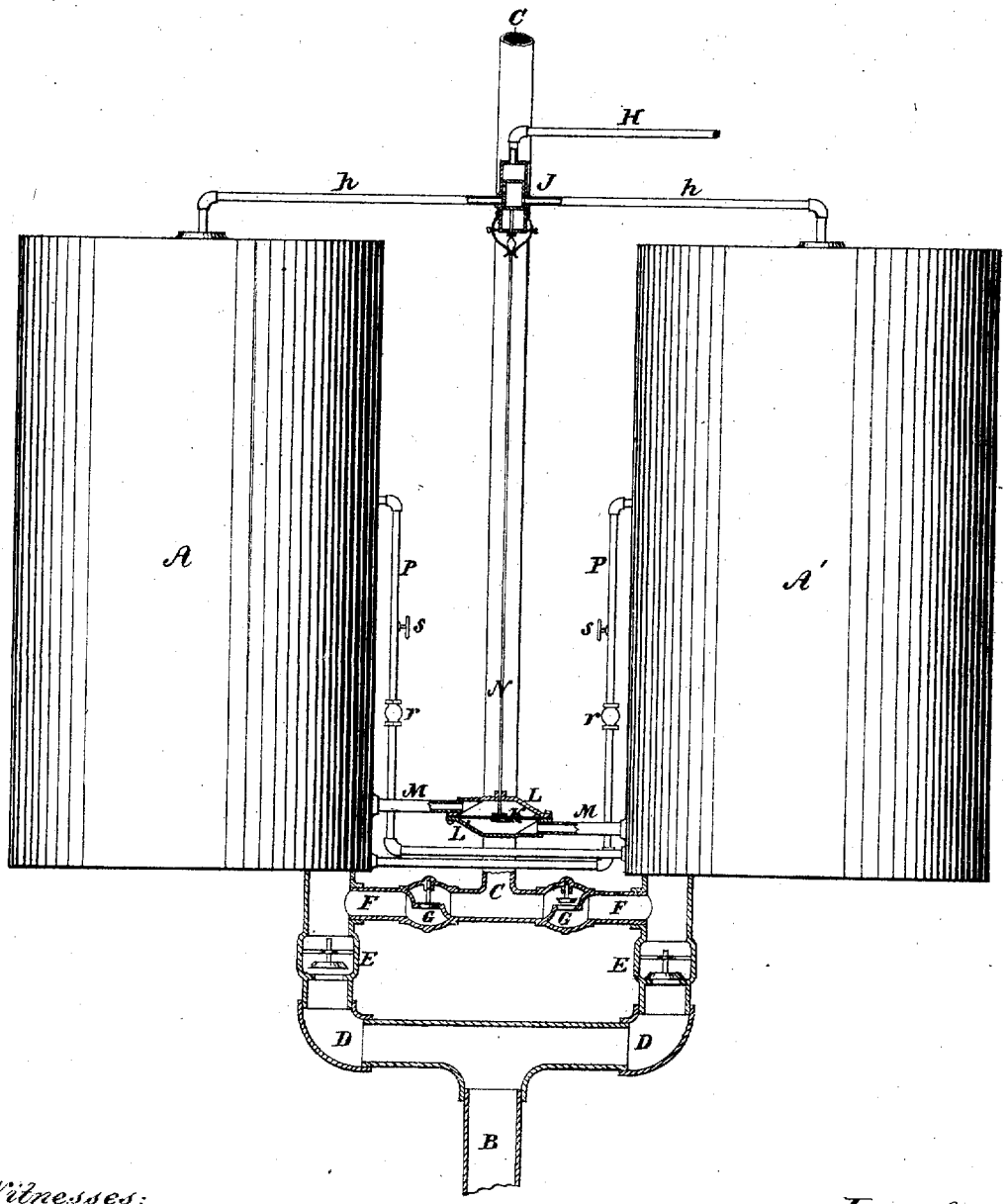
Witnesses:
Wm. H. Rowe
Elp Davidson
Inventor.
William E. Prall
By David A. Burr
Atty.
AM. PHOTO-LITHOGRAPHIC CO. N.Y. (OSBORNE'S PROCESS.)

UNITED STATES PATENT OFFICE.

WILLIAM EDGAR PRALL, OF WASHINGTON, DISTRICT OF COLUMBIA.

IMPROVEMENT IN STEAM WATER-ELEVATORS.

Specification forming part of Letters Patent No. 121,962, dated December 19, 1871; reissue No. 5,138, dated November 5, 1872.

*To all whom it may concern:*

Be it known that I, WILLIAM EDGAR PRALL, of the city of Washington, in the District of Columbia, have invented certain Improvements in Automatic Double-Acting Steam Vacuum-Pumps, of which the following is a specification:

My invention relates to that class of steam water-elevating engines constructed with two or more chambers or cylinders, in which the steam is made to bear directly upon the water in said chambers or cylinders to empty the same, and by its subsequent condensation to refill them. It consists, first, in combining with two chambers or cylinders of the water-elevating apparatus a yielding partition, (which may, as set forth in the Letters Patent granted to me July 4, 1871, and reissued October 29, 1872, consist of a flexible diaphragm, or of a piston moving bodily, as its equivalent,) which said partition is so placed between the two chambers, in connection or communication with the interiors thereof, as that any variations or differences of pressure within the chambers shall cause a movement of the partition toward the chamber in which the pressure is the lowest, and in connecting the valve or valves governing the steam-induction ports of the apparatus with the said yielding partition thus interposed between its chambers in such manner as that when, under the influence of a variation of pressure in the two chambers, the partition moves toward the chamber of least pressure, such movement shall close the port admitting steam to said chamber and throw open the port admitting steam to the other chamber; the object of this part of my invention being to produce an automatic movement of the valve or valves governing the admission of steam to the chambers of the apparatus, so that the steam shall be alternately cut off from the one and admitted to the other, leaving the one free to fill with water by means of the condensation of steam already admitted thereto, while the other is being emptied of water by the pressure of steam passing therein, and vice versa. It consists, second, in combining with the said cylinders or chambers small injection-pipes, each leading from the bottom of one cylinder to a point near the top of the adjacent cylinder, said pipes being each provided with a valve opening toward its upper end; the object of this part of my invention being to facilitate the condensation of steam in either cylinder by producing an injection of water therein from the opposite cylinder under steam pressure, as well as to equalize more or less the pressure in the two cylinders.

Figure 1 of the accompanying drawing represents partly in section a double-acting steam vacuum-pump fitted with my invention.

A A′ are the chambers or cylinders of the pump, having a common suction-pipe, B, and discharge-pipe, C. D D are branch pipes forming a connection between the bottom of each chamber and the single suction-pipe B; and E E are check-valves fitted in said branch inlet-pipes. F F are branch pipes forming a connection between the bottom of each chamber and the discharge-pipe C; and G G are check-valves fitted in said branch outlet-pipes. Instead of being connected directly to each chamber, these pipes are respectively fitted each to one of the pipes D D, between its check-valve and the chamber into which it opens, so that the two pipes D and F have a common opening into said chamber. H is a steam-pipe extending to a suitable boiler or steam-generator, and fitted with branch pipes *h h*, extending to and opening centrally into the top of each chamber. J is a two-seated valve, placed at the intersection of the branch pipes *h h* with the main steam-pipe H to govern the connection of said main pipe with its branches, so as that when communication with one branch is opened the supply of steam to the other shall be cut off, and vice versa. K is a yielding partition, consisting of a flexible diaphragm confined at its edges between an upper and a lower plate, L and L′, which form a casing therefor, said plates being concaved or hollowed out on their inner sides sufficiently to permit the center of the flexible diaphragm to move between them to an extent proportioned to the amount of play required in the movement of the steam cut-off valve J. M M are small pipes connecting, respectively, the space or compartment on one side of the diaphragm K with the lower portion of one chamber or cylinder and the space or compartment on the other side of the diaphragm with the lower portion of the other chamber or cylinder. Each space thus becomes virtually a part of the interior of the chamber with which it is connected, and the diaphragm, being mounted in the channel of communication which would otherwise be open between the chambers, through the connecting-pipes M M, serves in fact as a partition between the interiors of said chambers or cylinders. N is a rod, secured centrally to the diaphragm K, and which extends thence outwardly to the steam-valve J, the connection being so made and adjusted as that when the diaphragm is forced toward either chamber the admission of steam to that chamber shall be cut-off by the corresponding movement of the valve, and the steam-port into the other chamber be thereby thrown open. P P are small pipes connecting, respectively, the lower portion of one cylinder with the upper part of the other. Each pipe is provided with a check-valve, *r*, opening upward to permit a flow of water in one direction only, and also with a stop-valve, *s*, by which it may be entirely closed.

The operation of this apparatus is as follows: The cylinders A A′ being both filled with water, an equilibrium of pressure is established upon the opposite sides of the diaphragm or yielding partition K, so that it will drop down against the lower side of its casing under the weight of its attached rod N and thus cause the valve G to uncover and open the steam-port of the cylinder A′ on that side; or it may otherwise be easily moved in the opposite direction to effect an opening of the steam-port of the other cylinder A. In either case the movement of the diaphragm will serve to admit steam to one chamber and cut it off from the other. The pressure of the steam thus admitted over and upon the surface of the water in either cylinder (the cylinder A, for example) will gradually expel the water therefrom through the discharge-pipe C, and this pressure communicated through the small pipe M to the diaphragm will keep it forced toward the other cylinder A′ and thus keep the steam-port of the cylinder A open. So soon, however, as the water has all been expelled from the chamber or cylinder A, the steam passing out from the latter into its discharge-pipe will be thereby so far condensed as to quickly reduce the pressure in the cylinder A below that of the water in the other cylinder A′. The pressure upon the diaphragm being thus instantly reversed, said diaphragm will move toward the cylinder A, cutting off steam therefrom, and admitting it to the other cylinder A′. At the same time the excess of pressure in cylinder A′ will cause a stream of water to flow therefrom into cylinder A to assist in completing the condensation of steam therein, so that while the cylinder A′ is being discharged the cylinder A will rapidly fill because of the vacuum created therein. Thus the two cylinders will be alternately filled and emptied by means, first, of an alternate admission of steam to the one and the other, automatically produced by the movements of the diaphragm K, under the influence of the variations of pressure in the two cylinders; and, second, by an alternate condensation of steam in the one, and the other started by the passage of the steam into the discharge-pipe, and continued by an injection automatically produced at the proper moment through either pipe P, by means of the variations of pressure in the two cylinders.

I claim as my invention—

1. The method, substantially as herein described, of operating a cut-off valve or valves in a steam water-elevating apparatus by means of a yielding partition interposed between the two chambers, and actuated by the differences of pressure in said chambers.

2. A yielding partition, mounted in a channel of communication between the chambers or cylinders of a double-acting steam water-elevating apparatus, as a medium for communicating motion to the steam-induction valves of said chambers, substantially in the manner set forth.

3. In combination with two chambers or cylinders of a double-acting steam water-elevating apparatus, and with a valve or valves governing the admission of steam thereto, a yielding partition mounted in a channel of communication between said chambers, substantially as and for the purpose herein set forth.

4. Pipes P P, combined with and connecting the cylinders or chambers A A′, substantially as herein described, and provided with valves to regulate the flow of water therein, substantially as herein set forth.

W. E. PRALL.

Witnesses:
DAVID A. BURR,
WM. H. ROME.